United States Patent [19]
Trubert et al.

[11] 3,765,604
[45] Oct. 16, 1973

[54] MIXING FAUCET

[76] Inventors: Denis Trubert, 6 Avenue de General Gouraud; Michel Trubert, 18 rue Jules Herbron, both of Viroflay, France

[22] Filed: Mar. 7, 1972

[21] Appl. No.: 232,594

[30] Foreign Application Priority Data
Mar. 9, 1971 France .............................. 7108113

[52] U.S. Cl. .................. 236/12 R, 236/100, 137/90
[51] Int. Cl. .......................................... G05d 23/13
[58] Field of Search .................... 236/12 R, 100; 137/90

[56] References Cited
UNITED STATES PATENTS
3,228,603   1/1966   Norman ............................ 236/12 R
3,685,728   8/1972   Chapou ............................. 236/12 R Primary Examiner—William E. Wayner
Attorney—Linton & Linton

[57] ABSTRACT

This faucet for delivering from a supply of hot and cold fluids a mixed fluid having any desired output at a preset, substantially constant temperature comprises a thermostatic capsule responsive to the temperature of the mixed fluids for more or less closing the hot fluid inlet and/or the cold fluid inlet by means of a spool valve engaging on the one hand a fixed seat and on the other hand a movable seat responsive to said capsule. The arrangement is such that the complete unit comprising all the movable component elements of the faucet can be removed as a unit by using a simple, conventional spanner.

4 Claims, 1 Drawing Figure

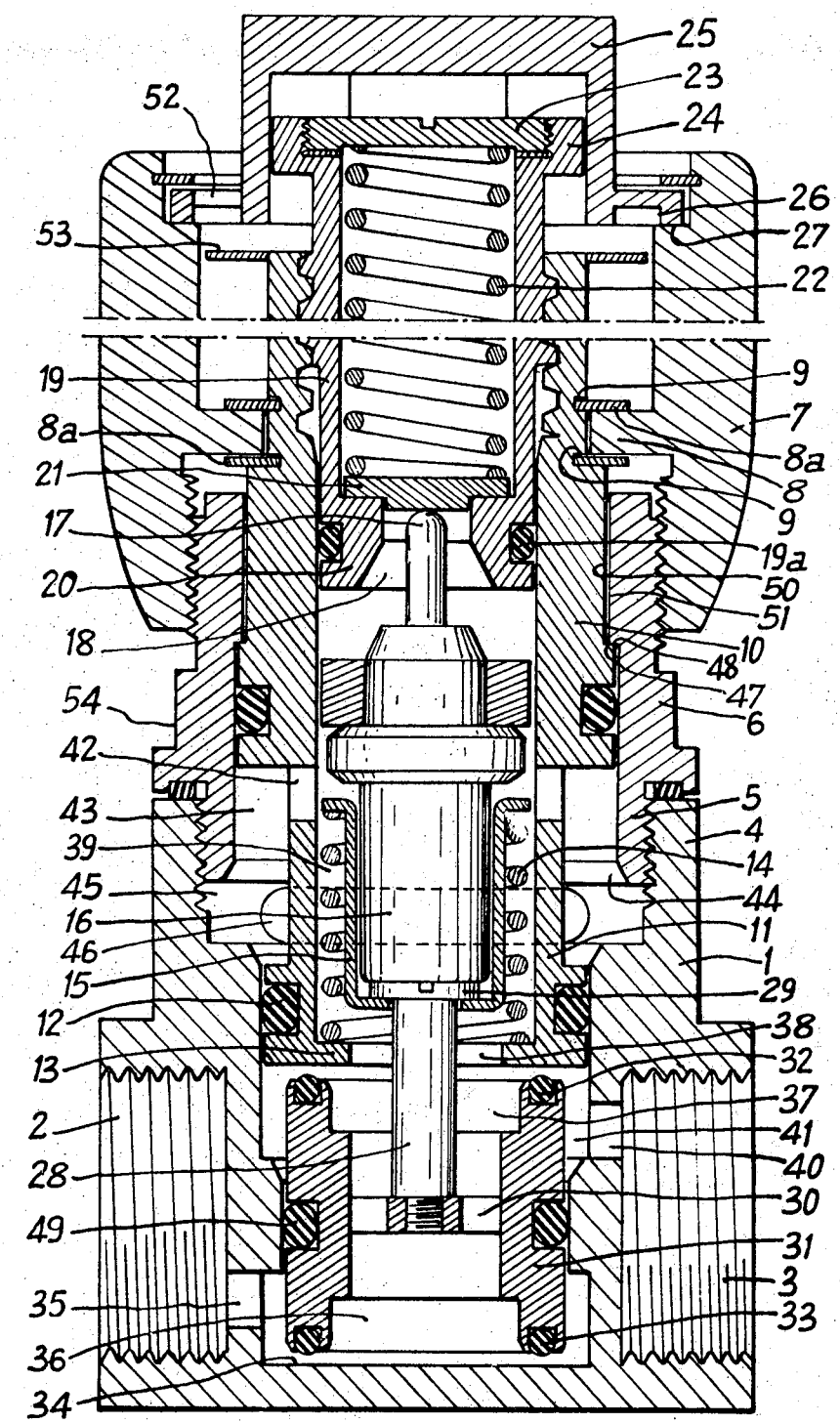

MIXING FAUCET

BACKGROUND OF THE INVENTION

This invention relates to mixing faucets of the type comprising a thermostatic capsule adapted, from a supply of hot fluid and a supply of cold fluid, to deliver a fluid output mixed at a predetermined ans substantially constant temperature, irrespective of the temperature and pressure of the hot and cold fluids, and also of the demanded output.

DESCRIPTION OF THE PRIOR ART

In many known types of mixing faucets the output of the mixed fluid delivered by the faucet is adjusted by acting directly upon the resulting mixed fluid output, notably the complete turning off of the mixing faucent output is obtained by closing by means of a suitable device the mixed fluid outlet duct or passage. A first inconvenience of these known mixing faucets is that in theier zero-outout position the hot-water and cold-water inlets remain in mutual communication, so that one of the fluids is frequently forced into the supply duct of the other fluid ; to avoid this inconvenience, a non-return valve must be inserted in each supply line, so tha the final cost of the faucet is increased considerably. Moreover, due to the fact that the faucet is adjusted at the mixed fluid outlet, temperature and/or input pulse effects are a frequent occurence in such faucets. Another inconvenience of hitherto known mixing faucets is the necessity of using three adjustment valves therein, two for metering the fluid temperature and a third one for controlling the mixed fluid output ; certain known types are even provided with four such valves. Finally, these known mixing faucets are objectionable in that any repair or maintenance work is attended by a time-robbing, delicate operation for taking them to pieces and subsequently re-assembling the component elements, since the simple procedure followed for conventional faucets, cocks and valves is not applicable to these complicated devices.

SUMMARY OF THE INVENTION a. The mixed fluid output adjustment is obtained by varying the hot and cold fluid inputs so thatwhen the faucet is in its zero output position both hot and cold fluid inlets remain closed, thus preventing any backflow of the one fluid into the delivery or supply line of the other fluid, this result being obtained without resorting to non-return valves ;

b. Only two valves secured to each other and carried by a same movable member are provided, the valves being associated the one with a movable seat and the other with a fixed seat, so tha a particularly simple and reliable assembly is obtained ;

c. the complete mechanism is interchangeable by simple removing a polygonal head by means of a common spanner or a conventional screw-spanner, without any complementary step.

The mixing faucet according to this invention is characterized in that it comprises, within the faucet body, a movable double valve member disposed between the hot and cold fluid inlet orifices and adapted to move in the general axial or longitudinal direction of the faucet between a first end position in which it engages in a fluid-tight manner a first fixed valve seat for discontinuing the supply of a first fluid and a second end position in which it engages in a fluid-tight manner a second fixed valve seat for discontinuing the supply of a second fluid, said second seat being howe er movable in th axial direction within the faucet body for engaging the corresponding face of the double valve member and cause the opposite face of said double valve member to engage said fixed seat for simultaneously discontinuing the supply of both fluids to the faucet.

The movable seat consists advantageously of the horizontal base of a longitudinal chamber of which the tubular vertical wall is movable in translation bodily with a rotary control member adapted to move by screwing through a limited stroke along the faucet body for adjusting the mixed fluid output thereof. Sais movable seat comprises an aperture permitting the ingress of said two fluids — of course when said hot and cold fluid inlets are not closed — into said longitudinal chamber in which they are mixed and caused to transmit their temperature to a thermostatic capsule connected to said movable double valve member through said aperture of the movable seat, whereby any variation in the temperature of the mixed fluid, by causing a corresponding variation in the longitudinal dimension of said thermostatic capsule, will cause a movement of said double valve member in the proper direction, i.e. for adequately reducing the input of one fluid while increasing accordingly the input of the other fluid and thus restore the initial temperature of the mixed fluid without having to correct the mixed fluid output.

DESCRIPTION OF THE PREFERRED EMBODIMENT

A clearer understanding of this invention can be had by reading the following description of a preferred embodiment given with reference to the attached drawing, of which the single FIGURE is a diagrammatic illustration given by way of example and in longitudinal section.

In the drawing, the reference numeral 1 designates the faucet body formed with tapped lateral ports 2 and 3 adapted to be connected to the hot water and cold water pipe lines, respectively (not shown). The body 1 comprises an axial passage formed with an internally screw-threaded upper portion 4 engageable by the externally screw-threaded lower portion 5 of an intermediate hollow member 6 of substantially cylindrical configuration, the upper portion of this member 6 coacting with the lower and also tapped end, of a rotary member 7 constituting the handle controlling the faucet output. This handle 7 is formed with an internal annular projection 8 provided with upper and lower resilient washers 8a adapted to engage with play corresponding notches 9 formed in the outer wall of an inner member 10 of substantially cylindrical configuration, disposed coaxially to said handle 7 and adapted to be moved in the axial direction by this handle 7, but not rotated thereby. This member 10 is prevented from rotating and allowed to move This member 10 is prevented from rotating and allowed to move for axial translation due to its polygonal outer cross-sectional contour 50 kept in constant sliding engagement and held against rotational movement in the axial aperture of corresponding polygonal inner cross-sectional contour 51 of member 6.

The lower portion 11 of member 10 which lies insides the body 1 and is in fluid-tight engagement with the inner wall of this body 1 due to the provision of an O-ring seal 12 comprises a bottom 13 engaged by the lower end of a coil compression spring 14 receiving through the medium of a hollow support 15 consisting for example of a simple U-shaped bent piece of flat metal the lower portion 16 of a thermostatic capsule of which the upper projecting portion 17 has a length varying as a function of the local temperature, this upper portion 17 extending through the lower portion of the axial opening 18 formed in a sleeve 19 screwed axially in the member 10 and in fluid-tight engagement with the inner wall of said member 10 through another O-ring seal 19a. At its lower end the sleeve 19 comprises an inner peripheral shoulder 20 engaged by a cross member 21 due to the pressure of another coil compression spring 22 adjustably pre-stressed by a cap 23 screwed to the upper end of sleeve 19. The upper end portion 17 of the thermostatic capsule which extends through said opening 18 is urged for constant engagement with the lower face of cross-member 21 by the aforesaid coil spring 14.

At its upper portion the sleeve 19 comprises a polygonal head 24 engaged between the inner, likewise polygonal walls of a cap 25 having a knurled outer surface and formed at its lower portion with an external flange 26 engaging an upper peripheral shoulder 27 of the inner wall of the rotating member or handle 7, so that the cap 25 can rotate about a vertical axis without causing the simultaneous rotation of handle 7.

The bottom of the hollow member 15 containing the thermostatic capsule has an axial hole formed therethrough to permit the passage of the shank 28 of a screw of which the head 29 is retained in said hollow member 15. The shank 28 of said screw also extends through the bottom 13 of member 10 and its screw-threaded tip engages a corresponding tapped orifice formed through a cross-member 30 carried by a cylindrical distributing spool 31 adapted to move longitudinally or axially in the lower portion of the inner space of said faucet body 1. The top and bottom edges of this spool carry O-rings 32 and 33, respectively, adapted to engage the lower, seat-forming bottom face of the lower end 13 of member 10, on the one hand, and the bottom 34 of body 1, on the other hand, as shown. Thus, the spool 31 divides the inner space of the faucet body into two chambers, i.e. an upper chamber and a lower chamber, separated by an intermediate O-ring 49 carried by said spool 31.

The hot fluid supplied through port 2 penetrates through a lateral hole 35 into the lower chamber of body 1 in which the spool 31 is adapted to move vertically, and then into this spool 31 through another opening 36 formed in its lower face, and emerges therefrom through an opening 37 formed in its upper face before flowing through the bottom 13 of member 10 (which is formed to this end with a concentric aperture 38) into the inner chamber 39 of member 10. On the other hand, cold water supplied through port 3 penetrates via an aperture 40 into the upper inner chamber 41 of body 1, then flows through the aforesaid aperture 38 into chamber 39 where it is mixed up with the hot water. The mixed water thus obtained in chamber 39 impinges against the thermostatic capsule 16 and escapes through lateral openings 42 of member 10 into an annular chamber 43 of intermediate member 6 and the, through the annular passage 44 formed by the base of member 6 the mixed fluid flows into a chamber 45 from which it is delivered through an outlet passage 46.

The intermediate member 6 comprises a polygonal portion 54 along its periphery, for example a hexagonal portion, permitting the easy unscrewing thereof by means of a spanner or screw-spanner of conventional type for removing the complete mechanism as a unit from the body 1 of the apparatus, for example when it is desired to substitute a new mechanism therefore, without any other intervention.

Now the mode of operation of the faucet will be explained with reference firstly to the method of adjusting or pre-setting its output. The faucet output is adjusted or preset by simply rotating the rotary member 7 which, due to the provision of its internal screw-threads, is thus caused to move vertically along said member 6 while carrying along the member 10 during its vertical movement.

Under these conditions it is clear that if the rotation of member 7 is attended by the downward movement of translation of said member 10, the spool 31 itself will also be carried along in the downward direction so that its O-ring 33 will be brought nearer to the fixed seat 34, thus reducing the permissible water input delivered to chamber 39. This reduction is attended by a reduction in the temperature of the mixed water which is counteracted immediately, in a manner to be explained presently, by the temperature regulating device which causes an upward movement of spool 31 for increasing the passage or gap between the fixed seat 34 and the lower face of spool 31, thus increasing the hot water input delivered to chamber 39. At the limit, for closing the faucet the lower O-ring 33 of spool 31 engages its seat 34, then the movable seat 13 engages the upper face of spool 31, thus enforcing the sealing contact between the lower O-ring 33 and the corresponding fixed seat 34 and turning off completely both hot water and cold water supplies while isolating these supplies completely from each other. Moreover, it will be noted that the maximum output position of the faucet is obtained (as shown in the Figure) when the movable seat 13 is in its uppermost position in which the shoulder 47 carried by member 10 abuts a corresponding shoulder 48 of member 6.

The variation in the mixed water output temperature is obtained by causing the upward and downward movement of sleeve 19 in relation to member 10. In fact, the mixed water output temperature is a direct function of the space allowed for the thermostatic capsule in chamber 39, the length of this capsule being either increased by thermal expansion in case of temperature increment in the mixed water medium in which it is immersed, or reduced in case of this temperature decreases. It is therefore clear that the temperature of the mixed water delivered by the faucet can be adjusted by simply rotating the cap 25 in one or the other direction, thus causing a corresponding rotation of sleeve 19 and therefore a vertical upward or downward movement of rotation thereof, by screwing, in relation to member 10. It will be noted that in relation to this member 10 the rotation of cap 25 is not attended by the rotation of the rotary member 7 and by any change in the faucet output.

The desired temperature of the mixed water is thus preset by properly rotating the cap 25, more particularly by causing a horizontal window 52 thereof to register with the proper value of a graduate scale 53 carried by the upper portion of member 10, the thermostatic capsule filling completely in this case the free space of chamber 39, or, in other words, its upper end 17 engaging the cross-member 21 which does not depress under normal operating conditions. If the temperature of the mixed water in chamber 39 increases and exceeds the preset temperature value, the thermostatic capsule is elongated and compresses the spring 14 (weaker than spring 22) while acting upon the shank of screw 28 for bringing the lower face of spool 31 nearer to the fixed seat 34 in order to reduce the hot water input while increasing the cold water input until the temperature of the mixed water in chamber 39 has resumed the preset value in order to reduce the length of the thermostatic capsule and move the spool 31 in the direction of the upper seat 13 as a consequence of the action exerted by spring 14.

Conversely, if the temperature of the mixed water in chamber 39 decreases, the length of the thermostatic capsule decreases likewise, thus entailing a movement of the upper face of spool 31 towards the seat 13 and therefore a reduction in the cold water input and an increment in the hot water input until the temperature of the mixed water in chamber 39 has resumed the preset value, thus causing an elongation of capsule 16 and the return movement of spool 31.

It will be noted that in case the mixed water temperature in chamber 39 increases considerably, thus causing a capsule elongation in excess of that required for producing a complete sealing engagement between the lower face of spool 31 and its seat 34, the cross member 21 would be pushed upwards against the force of spring 22, to avoid any damage to the capsule.

It is clear that the above description is given by way of illustration, not of limitation, since many modifications and variations could be brought thereto without departing from the basic principle of the invention as set forth in the appended claims.

What we claim is:

1. A thermostatic mixing faucet adapted, from a supply of hot fluid and a supply of cold fluid, to deliver a mixed fluid output at a predetermined temperature, which comprises a faucet body having an axial bore and having two lateral inlets at its lower portion for supplying said hot and cold fluids respectively, a valve chamber formed in said lower portion, holes connecting said inlets to the lower and upper portions of said valve chamber, respectively, a moveable member, a spool valve mounted for vertical sliding movement in said valve chamber and provided with upper and lower seals and adapted to travel from a first end position in which said lower seal engages the bottom of said valve chamber in a fluid-tight manner to prevent the ingress of one fluid into said valve chamber and another end position in which said upper seal engages the top of said valve chamber consisting of the bottom portion of said moveable member from preventing the ingress of the other fluid into said valve member, said moveable member having a polygonal sectional shape and being housed in a part of corresponding shape of the faucet body in order to allow an axial movement of the moveable member while preventing any rotation thereof, a central hole in the bottom portion of said moveable member for the ingress of hot and cold fluids and at least one opening in the lateral wall of said moveable member registering with an outlet of the faucet body for the egress of the mixed fluid, a handle in threaded engagement with the external face of said faucet body and adapted by a rotational movement to move axially in relation to said faucet body, said handle co-acting with said moveable member to move this latter axially without causing it to rotate, a thermostatic capsule housed axially within said moveable member and co-acting at its upper end with an upper wall of said moveable member under the action of a spring, while the lower part of said thermostatic capsule is rigidly connected to said valve spool by means of an axial rod passing through the central opening of the bottom portion of said moveable member, and means for adjusting from the outside of said faucet body the position of said thermostatic capsule within said moveable member.

2. Thermostatic mixing faucet according to claim 1, wherein means for adjusting the position of said thermostatic capsule consist of a sleeve member positioned internally at the upper part of said moveable member in threaded engagement therewith and adapted to be rotated from the outside of said faucet body to move axially within said moveable member, said upper wall of said moveable member being supported by internal lower shoulders of said sleeve member and being forced against said shoulders by a spring housed within said sleeve member and bearing at its upper end on a transverse upper cap of said sleeve member.

3. Thermostatic mixing faucet according to claim 2, wherein said transverse upper cap is in threaded engagement with the upper end of the lateral wall of said sleeve member and capable of being rotated to move axially with respect to said sleeve member for adjusting the force exerted by said spring.

4. Thermostatic mixing faucet according to claim 2, wherein a control rotating cap provides the axial movements of said sleeve member by rotatably driving its upper, polygonal-sectional contour of said control rotating cap.

* * * * *